Aug. 1, 1939.  E. H. LAND  2,168,221
LAMINATED LIGHT POLARIZER
Filed Oct. 14, 1936
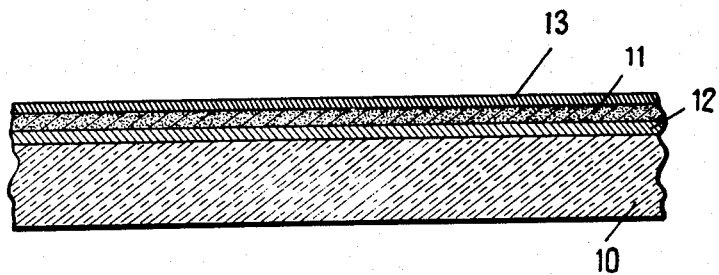
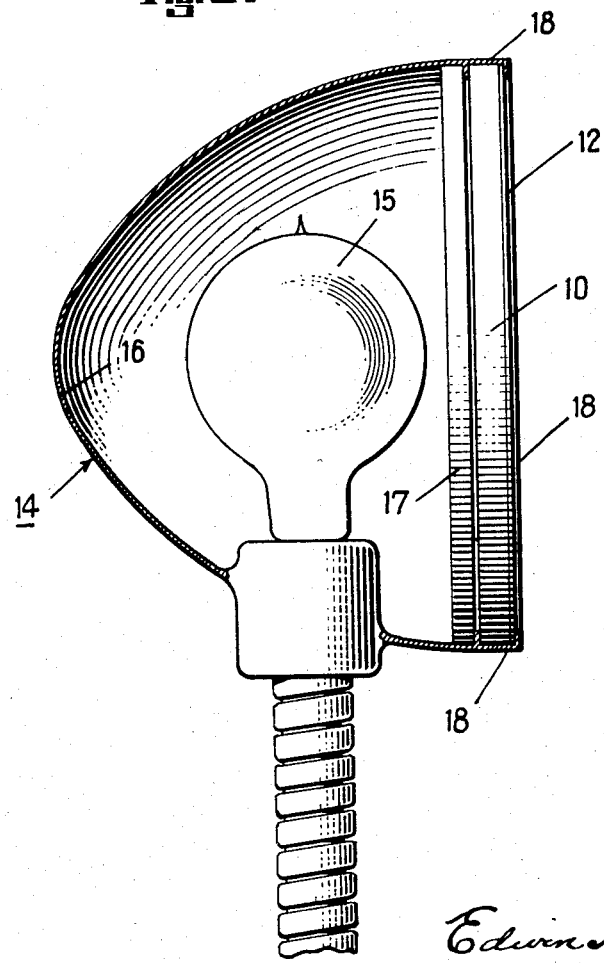

Patented Aug. 1, 1939

2,168,221

UNITED STATES PATENT OFFICE 2,168,221

LAMINATED LIGHT POLARIZER

Edwin H. Land, Wellesley Farms, Mass., assignor, by mesne assignments, to Polaroid Corporation, Dover, Del., a corporation of Delaware Application October 14, 1936, Serial No. 105,512

13 Claims.  (Cl. 88—65)

This invention relates to a new and improved laminated light-polarizer, adapted for use closely adjacent a light source.

Objects of the invention are to provide a sheet of light-polarizing material permanently affixed or laminated to a transparent support upon one of its faces only, and to provide such a product wherein the adhesive employed may comprise a plastic and more specifically a vinyl compound, such, for example, as highly polymerized vinyl acetate plasticized with a non-solvent of the light-polarizing sheet employed in the product.

Other objects of the invention are to provide a light-polarizer comprising a light-polarizing film or sheet adhesively affixed to a single transparent support, such as glass, and to provide such a polarizer wherein the adhesive employed may comprise a plastic and a non-solvent of the polarizing film or sheet.

A still further object of the invention is to provide a self-supporting light-polarizing screen adapted for use in close proximity to a light source and comprising a single transparent supporting element and a light-polarizing element whereby when said screen is employed with the transparent supporting element positioned between the polarizing element and the light source, no further element will be present within which photoelastic effects may be set up.

A still further object of the invention is to provide, in combination, a glass supporting plate, a light-polarizing sheet or film permanently affixed thereto on one face thereof, and waterproofing or a protective covering for said polarizing sheet of such character as to show no strain when the assembly is heated.

Other objects of the invention will in part be obvious and will in part appear hereinafter.

The invention accordingly comprises the product possessing the features, properties, and the relation of elements which are exemplified in the following detailed disclosure, and the scope of the application of which will be indicated in the claims.

For a further and more complete understanding of the invention, reference should be had to the accompanying drawing, wherein:

Figure 1 represents a greatly enlarged cross section of a light-polarizer embodying the invention; and Fig. 2 represents a perspective view, with parts broken away, of such a light-polarizer employed with any suitable light source.

It has been found desirable frequently to provide a light-polarizer of relatively large area in connection with the propagation of a beam of light and to polarize the beam closely adjacent the light source. Such a polarizing screen should preferably be self-supporting and substantially rigid. Such a screen is highly desirable in many types of strain-testing devices where polarizers and analyzers of large surface area may be advantageously employed. Such a screen is also of great value in connection with the use of polarized light in photography where with a suitable light source it may provide a flood light or spot light emitting polarized light. Furthermore, such a screen may be employed to great advantage in connection with the elimination of glare from automobile headlights and the like where a polarizing element is placed closely adjacent the light source.

In all such uses, and in many other similar uses where the polarizer or the object illuminated thereby is to be viewed or photographed through an analyzer, it is highly desirable that the plane of polarization of the beam emanating from the source be uniform throughout the beam and unchanging in the operation of the device. If the light source adjacent which the polarizer is employed is at all intense, the elements comprising the polarizer soon become heated and slight strains are set up in such of the elements as may, for example, comprise the supporting plate or plates for the polarizing sheet, especially where such elements are made of glass, which in many cases is a preferred supporting element. These strains have no effect upon the characteristics of the beam transmitted by the light-polarizing element if they arise only in the supporting plate positioned between the sheet of polarizer and the light source, but if strains are set up in a transparent support between the light-polarizing sheet and an analyzer, photoelastic effects are produced and the direction of vibration of the transmitted beam may be altered throughout the area of strain. Such alteration in the direction of vibration of the polarized beam may be of a character to impair the effective polarization of the screen adjacent the light source by causing a noticeable brightening of the strained area when the analyzer is in crossed or blocking position with respect to the polarizing screen.

It has accordingly been found highly desirable to provide a light-polarizing element wherein no glass or other element subject to strain is employed adjacent the polarizing sheet itself on the side thereof farthest from the light source.

This invention contemplates the production of such a desirable light-polarizer. In the drawing, 10 represents a glass plate, and 11 represents a light-polarizing element which may preferably be a film or sheet possessing light-polarizing properties. Such an element may comprise a suspension of minute, asymmetric light-polarizing particles such, for example, as particles of herapathite in any suitable transparent suspending medium, such, for example, as a cellulose acetate sheet, the polarizing axes of the particles being oriented to substantial parallelism. Such a polarizing material is now being manufactured and sold under the trade-name "Polaroid." This material possesses certain distinct advantages. It is available in large areas. It is thin, pliable, and highly efficient as a polarizer. It may, furthermore, be adapted readily for use in the present invention. It is to be understood, however, that the present invention is not to be deemed limited to the use either of a glass supporting plate or a sheet of Polaroid as the polarizing means. Any suitable supporting plate and any suitable light-polarizing material may be employed.

The light-polarizing sheet 11 is preferably adhesively affixed to one surface of the glass plate 10 by means of an adhesive 12. This adhesive is preferably a non-solvent of the light-polarizing material employed, as, for example, of cellulose acetate and herapathite. Where the polarizer employed comprises a suspension of herapathite in cellulose acetate the adhesive may comprise a vinyl compound such, for example, as highly polymerized vinyl acetate plasticized with dibutylphthalate. A suitable adhesive has been found to comprise a mixture of approximately 325 grams of Vinylite A15 (the trade-name for a highly polymerized vinyl acetate) plasticized with approximately 100 c. c. of dibutyl-phthalate.

In the preferred process of uniting the polarizing sheet to the glass plate by means of the vinyl adhesive, the plasticized adhesive is thinned by the addition to the quantities already mentioned of approximately 420 c. c. of ethyl acetate.

The mixture of Vinylite A, the dibutyl-phthalate, and the ethyl acetate comprises a standard or stock solution for use in the manner hereinafter described in connection with the process of the invention.

When it is desired to produce one of the polarizers of the invention, a quantity of the stock solution just described is taken and again thinned by adding thereto an additional amount of ethyl acetate, preferably by adding to the stock solution one-third of its volume of ethyl acetate. The resulting solution has the consistency of an average paint.

A thin coat of this solution is then applied to one face of the glass plate and slowly dried. If the drying is unduly accelerated bubbles of solvent may form in the layer of adhesive, and this, if possible, is to be avoided.

Additional coats of the adhesive are then applied successively to the coated surface of the glass plate. Each coat is permitted to dry before the next coat is applied, and in all three or four coats may be applied and the resulting layer of adhesive may be approximately .005 inch in thickness. After the last coat of adhesive has been applied, the coated plate is dried until the ethyl acetate has substantially completely evaporated. Unless the solvent has been substantially completely removed by this step in the process, bubbles in the cement may later develop, and these bubbles may enlarge or grow during the further steps in the process. It is to be understood, of course, that with the use of suitable heating devices and drying devices, the length of time consumed in the drying steps may be substantially reduced. The drying should progress, however, at such a rate as to prevent the formation of undesired bubbles in the cement.

After the coating of cement has become substantially dry the polarizing sheet is placed in contact with the cement and pressed thereto. It has been found desirable to employ two pressing steps and to press the sheet of polarizing material progressively against the coated glass plate. This may be accomplished by running the plate and polarizing sheet through a pair of pressing rolls, for example, a pair of friction rolls held together if desired under spring tension. The rolls may be of rubber so as to permit the passage of the glass plate without breakage. After the polarizing sheet has been relatively lightly pressed to the coated surface of the glass plate, to insure a smooth contact the plate and polarizing sheet are again run through the pressing rolls with the pressure substantially increased.

The first and lighter pressing is desirable to smooth out any wrinkles that may otherwise be present in the polarizing sheet, and the second pressing step, where greater pressure is employed, has been found desirable in effecting a more substantial bond between the sheet of polarizing material and the cement.

Generally speaking the two pressing steps should be performed in a reasonably close sequence. It is probably not desirable to let the polarizing sheeting stand overnight, for example, in contact with the adhesive before the second pressing operation has been performed, for it tends to pull away from the adhesive very readily after the first pressing operation.

Even after the second pressing operation the polarizing sheet may be stripped from the plate and the adhesive coating thereon. In order to effect a satisfactory and substantial bond the polarizer and supporting plate may be subjected to a further heating and pressing. It will be apparent that the pressure employed should be substantially uniform over the entire surface of the combination, and where relatively large areas are produced this presents a considerable problem.

It has been found possible to effect a suitable pressing and heating by placing the lamination in a collapsible container, such, for example, as a rubber container, shaped approximately as is the polarizer. The container is then evacuated and adequate pressure thus brought to bear upon the glass plate and the sheet-polarizer through the collapse of the container walls. Where stacked polarizers are placed in the collapsible containers described, care should be taken to prevent inequalities in the contacting surfaces of the glass plates from cracking or breaking the polarizers.

The containers with the polarizers therein may be placed in any suitable heating means. The collapsible container may be connected to any suitable evacuator and the contents kept under a vacuum during heating within an oven. The oven temperature may run in the neighborhood of from 90 to 100° C. for best results, and the polarizers may be kept within the oven for a period of from one and one-half to two hours. It is understood that these temperatures and periods of time are not critical but are suggested as having been found to give desirable results.

After the polarizers have been kept under these temperatures and pressure conditions for the desired period, the collapsible containers may be removed from the oven and the contents permitted to cool, preferably while still under a vacuum. If the cooling takes place at or about room temperature, it should preferably continue for about one and one-half hours, at which time the containers may be opened and the polarizers removed and cleaned.

Thereafter the exposed surface of the polarizing sheet may be protected if desired by being coated with any suitable water-proof material 13. For example, a thin coating of a mixture of Vinylite dissolved in ethyl acetate may be applied. It has been found that two or three coatings of this solution give adequate protection.

Other methods may be employed for affixing a sheet of polarizing material to the single transparent supporting plate. The cement may be provided in thin sheets without employing any solvent therefor, and a sheet of the cement placed upon the supporting plate and covered by the sheet-polarizing material. The assembly may then be run through the pressure rolls to effect a smooth, preliminary bond and subjected to the pressure and heating treatment described above. The cement may also be applied to the transparent supporting element by first melting the adhesive, which in this case should preferably contain no solvent, and then by scraping or smearing the melted adhesive on to the transparent support. If this method of applying the adhesive is followed care should be taken to first heat the supporting plate to a temperature such that when the melted adhesive is applied breakage will not occur.

In all of these processes, after the adhesive has been applied to the plate either by melting and scraping it on or by painting it on, or by applying it in sheet form, it should be noted that two pressure steps are employed. The first step, which comprises passing the assembly through rolls or otherwise uniformly pressing the polarizing sheet to the adhesive on the transparent support, is performed in the absence of heat to slightly stretch the sheet-polarizer to eliminate any wrinkles therein and to insure that no air bubbles will be present in the finished lamination. The second pressure step, which comprises pressing uniformly, as for example under a pressure of about fifteen pounds per square inch in the presence of heat, as for example 95° C., is to insure a permanent bond between the supporting plate and the sheet-polarizing material.

It will be understood that while the process has been described in connection with the use of a glass supporting element, the polarizer of the present invention may employ other supporting means, such for example as relatively thick sheets of Celluloid or cellulose acetate, or other transparent media. Furthermore, the unlaminated face of the light-polarizing element may, if desired, be covered by any other suitable protective element than that described. For example, any suitable water-proofing material may be employed, or a thin sheet of a transparent protective medium may be affixed to the polarizer. Care should be taken, however, to employ materials and media which will not show photoelastic effects or strain when the polarizer is used adjacent a light source in the manner previously described.

In Fig. 2 a combination with light source and polarizing element is shown. There 14 represents generally any suitable source of illumination comprising a lamp 15, a reflector 16, and if desired a diffusing screen 17. The polarizer may be mounted closely adjacent the light source, as for example by means of the frame 18. The frame may, if desired, be an integral part of the housing, and the lamp and the polarizer may be positioned closely adjacent the light source. The diffusing screen may, if desired, be dispensed with, or the polarizer itself may employ a diffusing screen in the nature of a sheet of ground glass to which the sheet-polarizing material may be cemented in the manner described.

Care should be taken in employing the polarizer adjacent the light source that the relatively heavy supporting plate be positioned adjacent the light and between it and the polarizing element. As has already been pointed out, with such an arrangement the creation of strains in the supporting plate is unimportant, for they have no effect upon the beam polarized by the polarizing sheet affixed thereto.

It should be understood also that any suitable device, as for example a quarter wave device such as Cellophane, of suitable thickness, may be affixed to the sheet of polarizing material by the process already described, and the device thus adapted to transmit elliptically or circularly polarized light. Furthermore, where the device of the invention is employed in connection with display devices, such for example as advertising display devices, sheets of doubly refractive material may be affixed to the sheet of light-polarizing material by the process already described.

It will also be understood that the process of the present invention is adapted for use wherever a layer of material possessing optical anistrophy is bonded to a supporting plate. The material contemplated as adapted for use in connection with the process may be material possessing the property of double refraction or the property of dichroism or double absorption, each of which may be considered as an example of optical anisotropy.

It is also to be understood that in addition to the adhesives hereinbefore described as preferred in the process of the invention, other adhesives may be employed. Adhesives comprising acrylic acid esters, for example, have been found suitable.

It will be obvious that the process described may be effective to produce a lamination of a sheet of plastic, such for example as cellulose acetate, to a sheet of supporting material, such for example as glass, irrespective of the presence in the plastic of light-polarized material.

Since certain modifications in the article which embody the invention may be made without departing from its scope, it is intended that all matter contained in the above descripion or shown in the accompanying drawing shall be interpreted as illustrative and not in a limiting sense.

It is also to be understood that the following claims are intended to cover all of the generic and specific features of the invention, which, as a matter of language, might be said to fall therebetween.

Having described my invention, what I claim as new and desire to secure by Letters Patent is:

1. In combination, a light-transmitting supporting element showing photoelastic effects in polarized light when heated, a thin sheet-like layer having predetermined optical anisotropy and a layer of adhesive between said supporting element and said anisotropic layer and bonding said element and said layer together, the surface of said anisotropic layer not in contact with the adhesive being light-transmitting bonded to a thin film of material adapted to show no appreciable photoelastic effects when heated.

2. In combination, a light-transmitting supporting element showing photoelastic effects in polarized light when heated, a thin sheet-like, light-polarizing layer and a layer of adhesive between said supporting element and said polarizing layer and bonding said element and said layer together, the surface of said polarizing layer not in contact with the adhesive being light-transmitting bonded to a thin film of material adapted to show no appreciable photoelastic effects when heated.

3. In combination, a light-transmitting supporting element showing photoelastic effects when heated, a thin sheet-like light-polarizing layer, a layer of adhesive between the supporting element and the polarizing layer and bonding the element and layer together, said adhesive being a non-solvent of said polarizing layer, and a layer of transparent material bonded to the opposite face of said light-polarizing layer and adapted to show no appreciable photoelastic effects when heated.

4. In combination, a light-transmitting supporting element showing photoelastic effects when heated, a thin sheet-like light-polarizing layer having on one face thereof a transparent non-polarizing film showing no appreciable photoelastic effects when heated, and a layer of adhesive between the supporting element and the opposite face of the polarizing layer and bonding the element and layer together, said adhesive comprising a plasticized vinyl compound.

5. In combination, a light-transmitting supporting element showing photoelastic effects when heated, a thin sheet-like light-polarizing layer coated on one face with an adherent transparent non-polarizing film showing no appreciable photoelastic effects when heated, and a layer of adhesive between the supporting element and the polarizing layer and bonding the element and layer together, said adhesive comprising plasticized vinyl acetate.

6. In combination, a light-transmitting supporting element showing photoelastic effects when heated, a thin sheet-like light-polarizing layer coated on one face with an adherent transparent non-polarizing film showing no appreciable photoelastic effects when heated, and a layer of adhesive between the supporting element and the polarizing layer and bonding the element and layer together, said adhesive comprising highly polymerized vinyl acetate plasticized with dibutyl phthalate.

7. In combination, a light-transmitting supporting element showing photoelastic effects when heated, a thin sheet-like light-polarizing layer coated on one face with an adherent transparent non-polarizing film showing no appreciable photoelastic effects when heated, and a layer of adhesive between the supporting element and the polarizing layer and bonding the element and layer together, said adhesive comprising an acrylic acid ester.

8. In combination, a light-transmitting supporting element showing photoelastic effects when heated, a thin, sheet-like, light-polarizing layer comprising a suspension of oriented polarizing crystals in a light-transmitting medium having affixed thereto on one face thereof a thin film of a transparent, non-polarizing material showing no appreciable photoelastic effects when heated, and a layer of adhesive between said supporting element and said polarizing layer and bonding said element and layer together, said adhesive being substantially a non-solvent of said polarizing layer.

9. In combination, a light-transmitting supporting element showing photoelastic effects when heated, a thin, sheet-like light-polarizing layer comprising a suspension of oriented crystals of herapathite in a sheet of cellulose acetate and having bonded thereto on one face thereof a transparent, non-polarizing film of a material showing no appreciable photoelastic effects when heated, and a layer of adhesive between said supporting element and said polarizing layer and bonding said element and layer together, said adhesive being substantially a non-solvent of said polarizing layer.

10. In combination, a light-transmitting supporting element showing photoelastic effects when heated, a thin, sheet-like light-polarizing layer, and a layer of adhesive between said supporting element and said polarizing layer and bonding said element and layer together, the surface of said polarizing layer not in contact with said adhesive being coated with a waterproofing material which shows no appreciable photoelastic effects when heated.

11. In combination, a light-transmitting supporting element showing photoelastic effects when heated, a thin, sheet-like light-polarizing layer, and a layer of adhesive between said supporting element and said polarizing layer and bonding said element and layer together, the surface of said polarizing layer not in contact with said adhesive being coated with a material adapted to show substantially no photoelastic effects when heated.

12. In combination, a light source, means positioned adjacent said source and in the path of beams emanating therefrom and adapted to polarize said beams and comprising a supporting element adapted when heated to show photoelastic effects and a light-polarizing sheet bonded thereto, said supporting element being positioned between said source and said polarizing element, that surface of said polarizing element not in contact with the material effecting said bond being coated with a transparent, non-polarizing film of a material adapted to shown no photoelastic effects when the polarizing element is heated by said source.

13. In combination, a light source, means positioned adjacent said source and in the path of beams emanating therefrom and comprising a light-transmitting supporting plate adapted to show photoelastic effects when heated and a sheet of material bonded thereto and having predetermined optical anisotropy, the supporting plate being positioned between the light source and said sheet and that surface of said sheet most distant from the light source being coated with a film of a non-polarizing transparent material adapted to show no photoelastic effects when the sheet is heated by said source.

EDWIN H. LAND.